Jan. 7, 1969  J. T. McNANEY  3,420,949
LIGHT GUIDE MESSAGE CHARACTER DISPLAY APPARATUS
Filed Feb. 21, 1968  Sheet 1 of 2

INVENTOR.
Joseph T. McNaney

INVENTOR.
Joseph T. McNaney

United States Patent Office 3,420,949
Patented Jan. 7, 1969

3,420,949
LIGHT GUIDE MESSAGE CHARACTER
DISPLAY APPARATUS
Joseph T. McNaney, 8548 Boulder Drive,
La Mesa, Calif. 92041
Filed Feb. 21, 1968, Ser. No. 707,093
U.S. Cl. 178—30         7 Claims
Int. Cl. H04l 15/34

ABSTRACT OF THE DISCLOSURE

This invention represents a message character display device utilizing light guides for converting one or more light sources at the input thereof into character shaped arrangements of secondary point sources of light emanating from the output of said light guides. The device includes light guide support and orienting means comprised of one section which determines the character shaped arrangements of the guides at the light output surface, in combination with a second section which simplifies the relating of predetermined output ends of light guides to a certain number of light source positions at the input to the device. The support and orienting means permits the total number of light guides to be inserted and oriented in the device simultaneously.

Background of the invention

This invention relates to means of displaying meaningful message characters that have been derived from coded information in the form of on or off states of a plurality of light sources, and more particularly to such means which utilize a plurality of bundles of light guides for converting one or more individual sources of light into character shaped arrays.

This invention, therefore, relates to the type of character display means which I disclosed in my U.S. Patent No. 3,109,065, but contains improvements which permit such character display means to be fabricated simply and efficiently, and in the form of an extremely durable device.

The present invention includes also system and apparatus means for reducing the time and cost of manufacturing light guide devices of the type referred to herein, relative to presently known techniques.

Summary of the invention

The nature of the present invention is such that the assembly of an otherwise complicated arrangement of light guides is simplified by a unique light guide support and orientation means consisting of a combination of but two parts. The object of one such parts is to control the pattern of light guides at a display surface and the other part is to control the grouping of predetermined light guides and the positioning of these groups at the light input surface of the device.

A further object is to provide a light guide support means which can be readily adapted to rapid methods of receiving light guides, individually, or in groups, whereby the cost of both parts and materials are reduced to a minimum.

Other objects of the invention will best be understood from the following description when read with the accompanying drawings.

Description of the preferred embodiments

Figure 1:
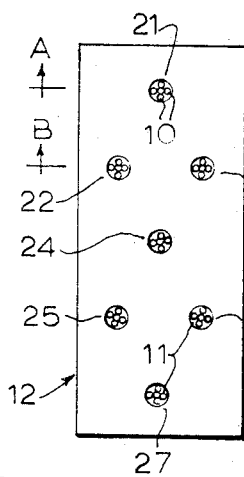
FIGURE 1 and FIGURE 2 show, respectively, a light admitting surface and a light emitting surface of an embodiment of the invention.
Figure 2:
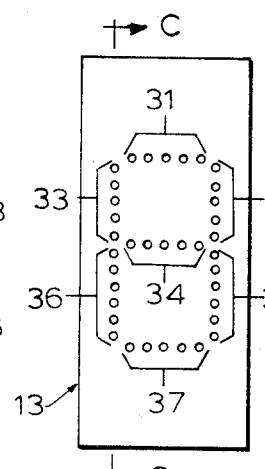

Referring now to FIGURE 1, a light admitting surface 10 of a plurality of groups of light guides 11 is illustrated. Each group of light guides 11 is bundled together, respectively, in holes 21 through 27 in what will be referred to as a first section 12 of the invention. For the purpose of describing the invention, and not to be limited in this regard, I have shown but seven such holes and in each hole the light admitting ends of five individual light guides are shown. In a second section 13 of the invention, shown in FIGURE 2, there are also seven groups of holes 31 through 37, which are related to the seven holes 21 through 27, and each of these holes contain at least one individual light guide. Light guides 11 bundled together in holes 21 through 27, therefore, extend through the first section 12 and through the second section 13 to the groups of holes 31 through 37, respectively. To exemplify further, if there are five light guides 11 bundled together in a hole 21, then there will be five holes in the group 31 through which the five light guides 11 will extend; and this will be the case where holes 22 and 32 are concerned; where holes 23 and 33 are concerned; etc.

The seven groups of light guides 31 through 37 are arranged in the manner shown to represent seven segments with which a variety of message characters may be displayed. When illuminated with light the segments 31, 32 and 35 will represent numeral 7; the segments 31, 32, 34, 35 and 37 will represent numeral 3; the segments 31, 33, 34, 35, 36 and 37 will represent numeral 6; all segments will represent numeral 8; etc. Still more additional such segments, beyond the seven illustrated, may be used to provide a much larger number of differently formed character shaped arrangements of illuminated light guides.

Figure 3:
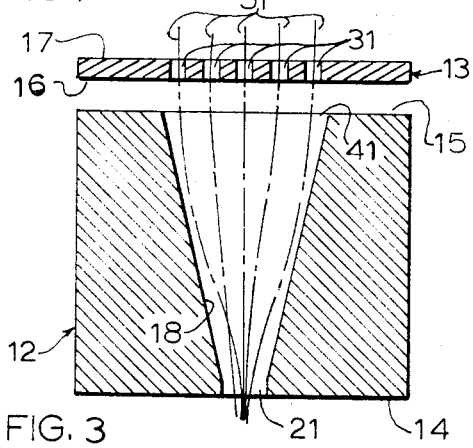
FIGURE 3 shows a section through A—A of FIGURE 1.
Figure 4:
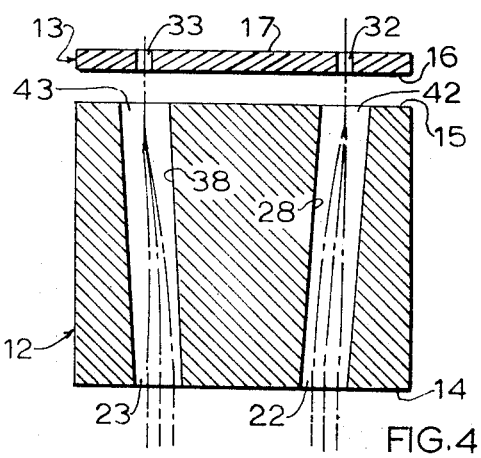
FIGURE 4 shows a section through B—B of FIGURE 1.
Figure 5:
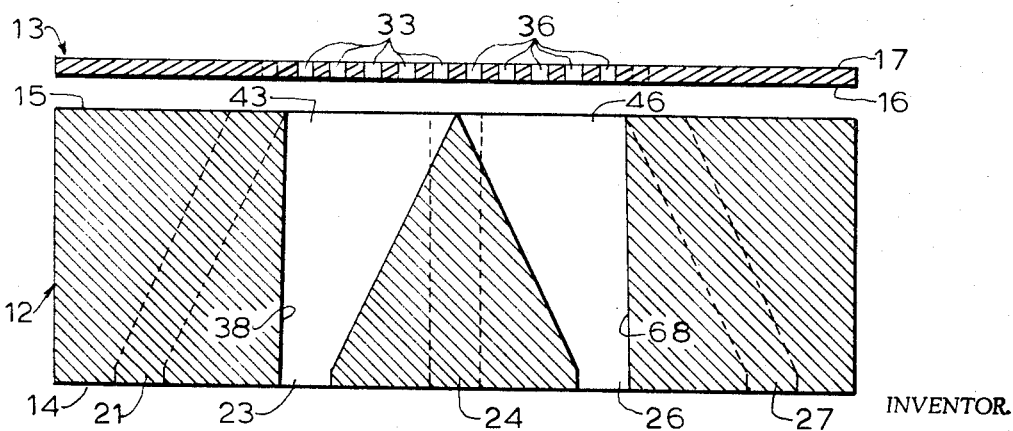
FIGURE 5 shows a section through C—C of FIGURE 2.

A somewhat more detailed illustration of the invention is shown in FIGURES 3, 4 and 5, which includes exploded and cross sectional views of the invention described thus far. The first section 12 has first and second surfaces 14 and 15, and the second section 13 has first and second surfaces 16 and 17. Although the first section 12 is illustrated as being apart from the second section 13, in the process of making a complete device the first and second sections thereof will be fixedly attached to each other at their respective surfaces 15 and 16.

Referring to FIGURE 3, the opening 21 extends from the first surface 14 to the second surface 15 and serves as a funnelform passageway having a predetermined size opening 21 extend to a comparatively larger opening 41 in the second surface 15. The opening 21 is of a size just large enough to position a predetermined group of light guides within a small area, and the opening 41 is of a size and configuration that extends over an area that at least compares with the area taken up by the holes 31 in the section supporting these holes. The funnelform passageway 18, therefore, will cause light guides entering the group of holes 31 to follow respective paths 51 toward and through the opening 21 at the smaller end of the passageway 18.

The cross section of the device in FIGURE 4 shows the two funnelform passageways 28 and 38, having an opening 22 and 23, respectively, connected therethrough to openings 42 and 43 adjacent holes 32 and 33 in the second section 13. In the cross section shown in FIGURE 5 the funnelform passageways 38 and 68 interconnects openings 23 and 26, respectively, with openings 43 and 46 adjacent holes 33 and 36 in the second section 13.

Figure 6:
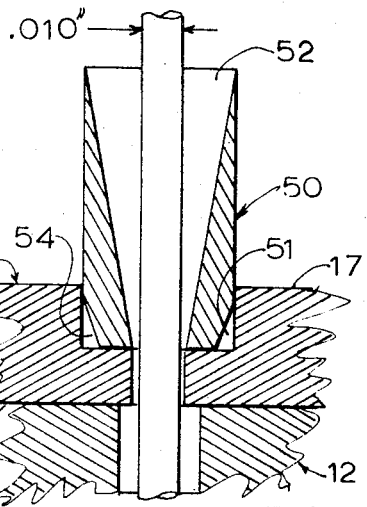
FIGURE 6 is a small sectional view of the invention adapted to means for inserting light guides in the device.

Referring now to FIGURE 6, a small portion of the device of this invention is shown in combination with an adapter funneling means 50. In this embodiment each of the holes 31 through 37 in the second section 13 will be enlarged, or counterbored, to provide a hole 51 in the surface 17 to receive the light guide funneling means 50. This latter means 50 has a mouth 52 at the one end of its funnel-like opening, and will be many times larger than the opposite end thereof shown inserted in the hole 51.

Light guides are made of many different light conducting materials and in many different diameters. However, the light guide in particular that may be considered in connection with this invention is called Crofon, available from the E. I. du Pont de Nemours & Company Inc., in a 0.010″ diameter. Since this light guide is made of a high quality plastic and quite easy to work with, its use is preferred in connection with this invention, but is not to be limited to its use. Light guides of other materials, such as glass, can be used as well.

If, for example, the 0.010″ diameter light guide is used in this invention, and as indicated in FIGURE 6 the mouth 52 may have a diameter of 0.1″ or larger, or large enough to make threading a light guide therethrough easy. The holes of each group 31 through 37 would be a few thousandths of an inch larger, or 0.015″ diameter on 0.020″ to 0.030″ center-to-center spacings. Therefore, the hole 51 in the surface 17 will be equal to such center-to-center dimensions, and the opposite end 54 of the funneling means 50 will be made to fit quite readily in the hole 51. The object of the combination of FIGURE 6 is to simplify hand threading of light guides into the holes 31 through 37, while the device itself directs, automatically, light guides through their respective openings 21 through 27 by means of the funnelform passageways in the first section 12 thereof. After all of the holes 31 through 37 have been threaded with at least one light guide an epoxy, or other suitable cement means, is put in the space around the light guides within the openings. Upon hardening excess epoxy and light guides are removed and the two surfaces 14 and 17 are polished smooth and lacquered to enhance the light conducting ability of the light guides at the light admitting and light emitting ends thereof.

Other interesting dimensions of the device described and illustrated hereinbefore are that character shaped arrays may measure .150″ x .300″, and the overall dimensions of the two sections will measure .3″ x .6″ and have a depth of .4″. Using the technique of FIGURE 6 all of the light guides may be inserted in less than five minutes. Through the use of the embodiment of FIGURE 7 however, all of the light guides will be inserted simultaneously in but a few seconds.

Figure 7:
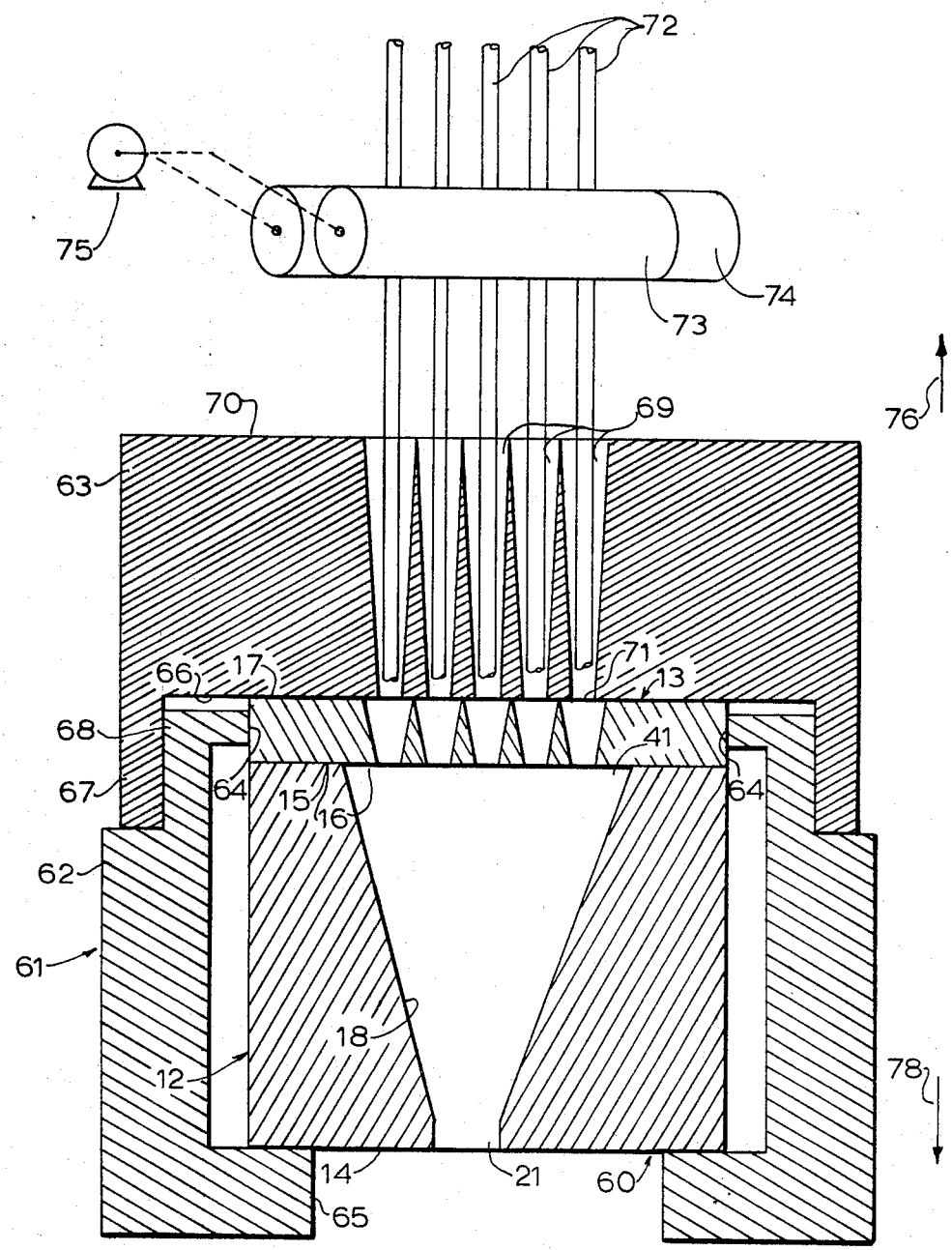
FIGURE 7 is a diagram, and a cross section, of means for inserting a plurality of light guides in the device simultaneously, but shows only a cross section of the device through A—A of FIGURE 1.

Referring now to FIGURE 7, the device and means to which it is adapted for feeding light guides to all of the holes 31 through 37 simultaneously is illustrated in a cross sectional view thereof. The device 60 is shown as a section through A—A of FIGURE 1, however, the section 13 has been modified to the extent that all of the holes therein, or the holes to be included in groups 31 through 37, are funnelformed whereby their openings are 0.030″ diameter on 0.030″ center-to-center spacings in the surface 17, and 0.015″ diameter in the first surface 16. If each group contains, for example, five holes as indicated, and extended to an area dimension of 0.150″ for the entire group, then the opening 41 of the funnelform passageway 18 would measure at least 0.150″ in the direction indicated, and preferably more than this particular dimension of 0.150″.

The light guide feeder means 61 is exemplified as having at least two parts 62 and 63. The support part 62 will allow the device to be positioned between and along an upper side wall 64 while resting on a bottom portion 65. The feeder part 63 is placed over the device 60, having a surface 66 engaging the surface 17 of the device 60 and a flange 67 for locating the part 63 in relation to a mating flange 68 of the support part 62. The feeder part 63 will contain a plurality of funnelformed openings 69, or at least the same number and array of openings in the section 13 of the device 60, which will be aligned with the openings in the section 13. The openings 69 will be 0.030″ diameter on 0.030″ centers at the top surface 70 tapering down to 0.015″ in the lower surface 71. When in a mating position the array of 0.015″ openings in the surface 71 will be aligned with the array of 0.030″ openings in the surface 17. The mating tolerance of the invention as illustrated and described will be at least 0.007″ from an absolute center position, and in every direction therefrom.

In the few openings 69 exemplified in the diagram of FIGURE 7, there is shown a light guide 72, each in position to be received by the device 60. However, it should be understood that if the device 60 has an array of openings in number and groups illustrated in FIGURE 2, there will of course be a similar number of guides 72 in position to be fed into the device 60. Although not shown in the drawing, each of the guides 72 will arrive at the positions indicated from a plurality of spools, there being a separate spool for each light guide 72. By means of a system of drive wheels 73 and 74, and a motor means 75, the guides 72 will be inserted in the device 60 until they have at least reached the surface 14 of the device, but preferably some predetermined distance beyond the surface 14.

A following step in the procedure will include separating the feeder part 63 from the support part 62 by moving the part 63 in the direction of the arrow 76 a predetermined distance. A shearing tool is then used to sever the guides 72 at the surface 66 of the feeder part 63. The support part 62 is then moved in the direction of the arrow 78 far enough to remove the device 60 and then insert another device into the support part 62. Following the removal of the device 60 the guides 72 will be fixed therein with a cement means at the openings in surfaces 14 and 17. These surfaces are then made smooth, polished and lacquered. When exposed to a source of light emitting ends of the seven groups of light guides 31 through 37 will appear as seven message character defining arrays, or segments, with which a variety of differently formed character shaped arrangements may be obtained.

I wish to note that the particular embodiments of the invention described herein is illustrative only, and that the invention includes such other modifications and equivalents as may be seen by those skilled in the arts, but still within the scope of the appended claims.

I claim:
1. Means for utilization in connection with message character display apparatus of the type containing a plurality of groups of light guides, wherein light guides of each group have light admitting ends bundled together in one part thereof and light emitting ends at a display surface thereof positioned in predetermined arrays for presenting message characters, wherein the improvement comprises:
 (a) light guide positioning means including first and second sections:
 (b) said first section having first and second surfaces and a plurality of funnel form passageways for guiding light guides therethrough from said second surface to said first surface, each passageway having a predetermined size opening at said first surface and a comparatively larger opening at said second surface;
 (c) said second section having first and second surfaces and a plurality of groups of holes, each group of holes (1) extending from said first surface to said second surface (2) forming a message character defining segment within said groups of holes and (3) extending over a predetermined surface area of said second section;

(d) said second surface of said first section fixedly attached to said first surface of said second section; and (e) each said predetermined surface area being not greater in size than, adjacent to, and in alignment with, one of said comparatively larger openings at said second surface of the first section, whereby, each said predetermined size opening will be connectedly related to the group of holes within said predetermined surface area through a funnelform passageway, so that light guides will be guided from each said group of holes through a funnelform passageway to one of said predetermined size openings.

2. The invention as set forth in claim 1 additionally including (f) a plurality of light guides within each said group of holes and extended therefrom and through one of said funnelform passageways to the predetermined size opening thereof so as to provide a bundle of light admitting ends of said light guides within said predetermined size opening.

3. The invention as set forth in claim 2 additionally including (g) each said plurality of light guides within each said group of holes comprising a predetermined segment of one, or more, differently formed character shaped arrangements of said light emitting ends.

4. The invention as set forth in claim 1 additionally including (f) the opening of said holes at the second surface of said second section being enlarged to a size greater than the corresponding opening of said holes at the first surface of said second section.

5. The invention as set forth in claim 4 additionally including (g) a light guide funneling means;
(h) said enlarged opening of said holes being adapted to receive said funneling means for inserting light guides in said holes.

6. The invention as set forth in claim 4 additionally including a (g) light guide insertion guidance member;

(h) said member having a surface adjacent to second surface of said second section and a plurality of holes therethrough, each hole being aligned with a hole at said second surface of the second section having an opening thereat which is smaller than the opening of said hole with which it is aligned, whereby, a plurality of light guides will be guided into said plurality of groups of holes in said second section simultaneously.

7. A message character display device including a plurality of groups of light guides, each group presenting light admitting ends and light emitting ends, wherein the improvement comprises:

(a) light guide support means presenting first and second surfaces, and a plurality of passageways extending therethrough between said surfaces;

(b) each said pasageway having but one opening in said first surface and a plurality of separate openings in said second surface;

(c) each said group of light guides enclosed, respectively, in each of said passageways, said light admitting ends of each group bundled together in the one opening of said first surface and said light emitting ends thereof supported individually in each of the openings of said second surface;

(d) said openings of the plurality of passageways in said second surface arranged therein to provide arrays representative of a plurality of segments of predetermined message characters, whereby, said light emitting ends in each of said arrays comprise a predetermined segment of one, or a number of different, message characters.

References Cited
UNITED STATES PATENTS 3,379,890 4/1968 Krieter.
3,215,029 11/1965 Woodcock.
3,043,179 7/1962 Dunn.

THOMAS A. ROBINSON, *Primary Examiner.*

U.S. Cl. X.R.

250—227; 88—1; 340—380, 324